United States Patent [19]

Gibbens

[11] 4,424,757

[45] Jan. 10, 1984

[54] FERTILIZING METHOD AND APPLICATOR FOR CONCURRENTLY INTRODUCING ANHYDROUS AMMONIA AND A PHOSPHORIC ACID INTO A FURROW

[76] Inventor: James R. Gibbens, R.R. #1, Cando, N. Dak. 58324

[21] Appl. No.: 308,618

[22] Filed: Oct. 5, 1981

[51] Int. Cl.³ .............................................. A01C 23/00
[52] U.S. Cl. .................................................. 111/7
[58] Field of Search ...................... 111/6, 7, 80, 86, 73

[56] References Cited

U.S. PATENT DOCUMENTS

| | | | |
|---|---|---|---|
| 2,781,612 | 2/1957 | Dugan | 111/58 |
| 3,188,989 | 6/1965 | Johnston | 111/86 |
| 4,341,168 | 7/1982 | Siebert | 111/7 |

*Primary Examiner*—Richard J. Johnson
*Assistant Examiner*—Danton DeMille
*Attorney, Agent, or Firm*—Peterson, Palmatier, Sturm, Sjoquist & Baker

[57] ABSTRACT

The applicator includes a blade member having a forwardly directed cutting edge. Secured to the rear edge of the blade member is a first tube having a horizontal discharge opening at its lower end via which anhydrous ammonia is introduced into a furrow. Secured rearwardly of the first tube is a second tube having a horizontal open end via which a phosphoric acid is introduced concurrently into the same furrow. Both discharge ends reside in parallel planes, the first discharge end being at a lower elevation than the second discharge end. The method of concurrently applying both anhydrous ammonia and a phosphoric acid results in increased yields as far as small grain crops are concerned.

3 Claims, 3 Drawing Figures

U.S. Patent    Jan. 10, 1984    4,424,757
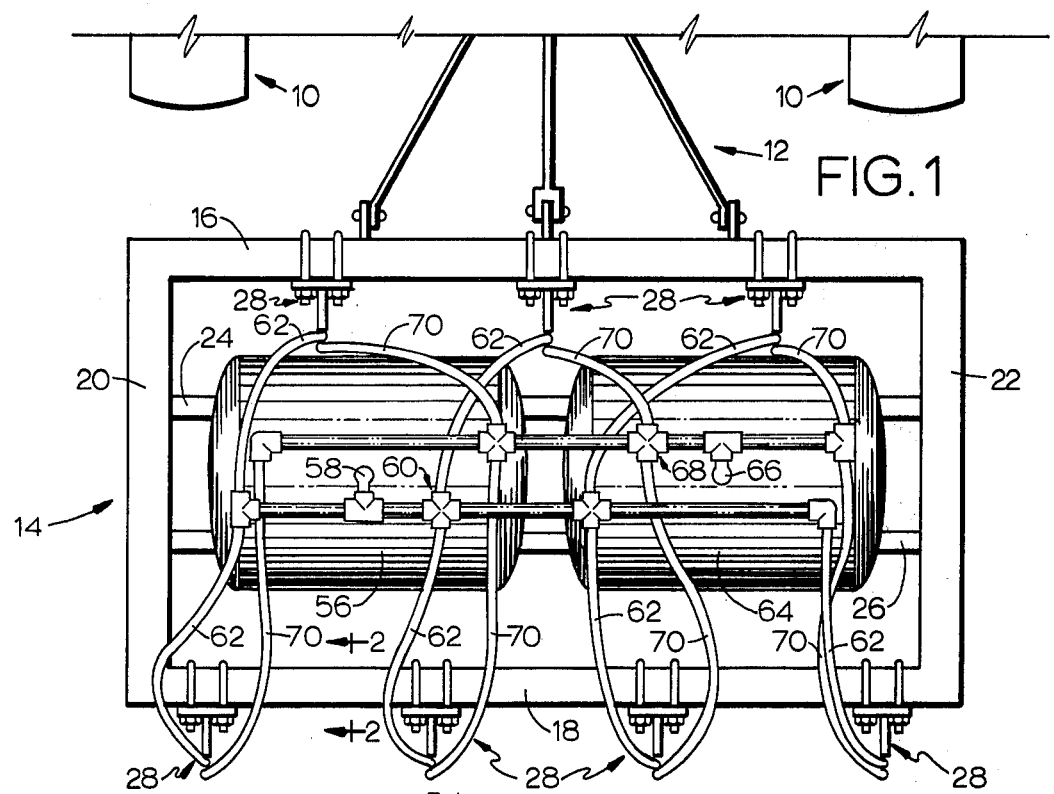
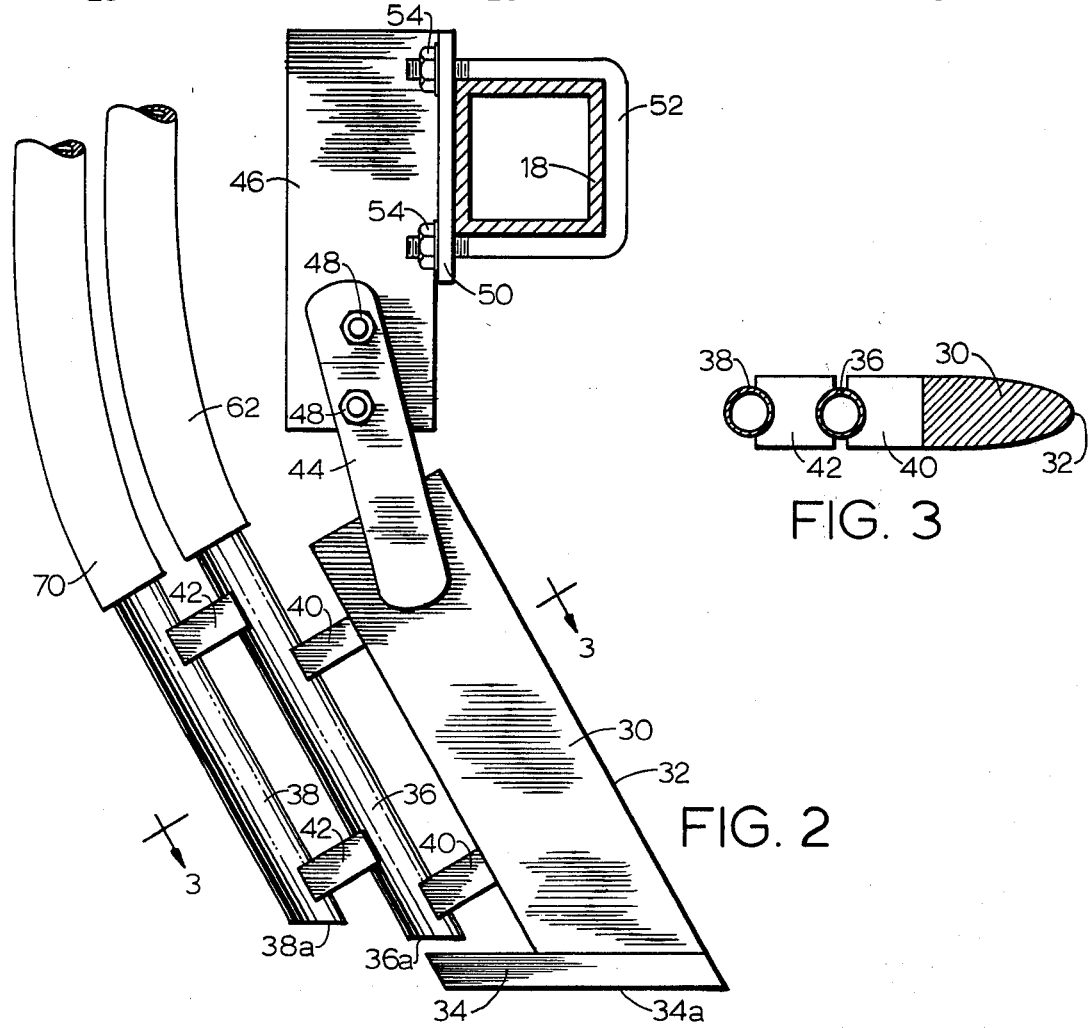
FIG. 1
FIG. 2
FIG. 3

FERTILIZING METHOD AND APPLICATOR FOR CONCURRENTLY INTRODUCING ANHYDROUS AMMONIA AND A PHOSPHORIC ACID INTO A FURROW

BACKGROUND OF THE INVENTION

1. Field of the Invention

This invention relates generally to fertilizing equipment, and pertains more particularly to an applicator and method for simultaneously applying anhydrous ammonia and a phosphoric acid to the soil to be fertilized.

2. Description of the Prior Art

Two major fertilizers have been primarily utilized in the past in conducting grain farming operations. One is nitrogen and the other is phosphorus. Nitrogen can either be applied in dry, liquid, or gaseous form. If applied in gaseous form, it can be directly utilized by the plant. Phosphorus, in the past, has been applied either as a liquid in the form of 10-34, a manufactured product, or various dry products that can be converted from a polyphosphate to an orthophosphate for assimilation by the plant.

Applying anhydrous ammonia, which is a gas, and phosphoric acid, which is a liquid, separately is quite time-consuming, requiring two passes of the equipment across the field. Experiments have demonstrated that the individual applications have not resulted in as good yields as when applied concurrently with each other.

SUMMARY OF THE INVENTION

Accordingly, an important object of my invention is to improve the yield, particularly with respect to small grains such as wheat, by simultaneously applying both anhydrous ammonia and a phosphoric acid to the soil. An aim of the invention, therefore, is to provide an applicator that will deliver both anhydrous ammonia, a gas, and phosphoric acid, a liquid, to appropriate release points at the proper depth in a furrow that is formed just ahead of the release of the alluded to fertilizer components.

Yet another object is to apply nitrogen in the form of anhydrous ammonia and phosphorus in the form of phosphoric acid at proper release or discharge points with respect to each other, one being in a trailing relation with the other, so that the combined effect of the two is superior to the result derivable individually. More specifically, it has been found that the discharge of the anhydrous ammonia at an appropriate distance just ahead of the discharge of the liquid phosphoric acid results in a better assimilation of both of these components, thereby contributing to the improved yield that has already been mentioned.

Still another object of the invention is to provide an applicator that can be fabricated inexpensively, thereby encouraging the widespread dual application of both anhydrous ammonia and a phosphoric acid.

Another object is to provide an appropriate spacing or distance between the release points so that the liquid does not react with the ammonia, a reaction of this type causing the applicator tubes to become plugged at their discharge ends.

Still further, an object of the invention is to provide an applicator that will simultaneously apply both nitrogen and phosphorus in a manner such that the applicator or delivery tubes are not apt to beome clogged with soil.

Still another object is to provide an applicator of the foregoing character that can be attached to conventional clutivator frames or can be mounted directly on a tractor via a tool bar.

Briefly, my invention envisages the simultaneous introduction into a furrow of anhydrous ammonia and a phosphoric acid. In this regard, a blade member forms a very narrow furrow. The applicator tube for the anhydrous ammonia is secured directly to the rear edge of the blade. The applicator tube for the liquid phosphoric acid is secured to the tube for the ammonia. The last-mentioned tube is spaced a certain distance rearwardly of the first tube, particularly at the release or discharge point, so that there will not be an adverse reaction between the anhydrous ammonia and the phosphoric acid which causes the discharge ends of the applicator tubes to become plugged.

BRIEF DESCRIPTION OF THE DRAWING

FIG. 1 is a top plan view of equipment utilizing an applicator constructed in accordance with my invention;

FIG. 2 is an enlarged elevational view of one of the applicators of FIG. 1, the view being taken in the direction of line 2—2, and FIG. 3 is a transverse sectional view to the applicator exemplifying my invention, the view being in the direction of line 3—3 of FIG. 2.

DESCRIPTION OF THE PREFERRED EMBODIMENT

In order to illusrtate my invention, a rear portion of a tractor 10 has been shown in FIG. 1, having a conventional three point hitch 12 mounted thereon. Connected to the hitch 12 is a cultivator box frame 14 having a front transverse beam 16 to which the hitch 12 is connected, a rear transverse beam 18, side beams 20 and 22, and auxiliary beams 24 and 26.

While my invention permits the use of any number of applicators, it will be observed from FIG. 1 that seven such applicators have been connected to the frame 14. These applicators have been denoted generally by the reference numeral 28.

Describing one applicator 28 in detail, reference should now be made to FIGS. 2 and 3 where a blade member 30 has been depicted, the blade member 30 having a forwardly directed cutting edge 32. At the lower end of the blade 30 is a pointed shoe member 34 having a flat bottom surface 34a which resides in substantially a horizontal plane as the blade 30 is pulled through the soil by the tractor 10 in the forming of a relatively narrow furrow.

Playing an important role in the practicing of my invention are two supply tubes. The first supply tube has been labeled 36 and from FIG. 2 it will be discerned that it has a flat discharge end 36a. The second tube has been labeled 38 and it also has a flat discharge end which has been labeled 38a. It will be noted that the flat bottom 34a, the discharge end 36a and the discharge end 38a reside in parallel horizontal planes.

The tube 36 is fixedly secured to the rear of the blade 30 by means of two blocks 40, one being spaced above the other as can be readily understood from FIG. 2. The forward side of each block 40 is flat so as to be readily welded to the rear edge of the blade 30. The rear side of the two blocks 40 in each instance are curved so as to facilitate the welding thereof to the tube 36.

Somewhat similarly, there are two additional blocks 42, both having notched sides. The forward side is welded directly to the tube 36, whereas the rear side is welded to the tube 38. It is felt that this is readily comprehendable from what has been set forth in FIGS. 2 and 3.

The upper end of the blade 30 has a pair of ears 44 welded thereto so that the ears 44 receive therebetween the lower end portion of a mounting arm 46. The ears 44, and hence the blade 30 itself, is attached to the mounting arm 46 by means of a pair of bolts and nuts 48 as can be seen in FIG. 2.

Close inspection of FIG. 1 will reveal that when looking down on a given applicator 28, one sees a T-shaped configuration. This is by reason of a vertical strip 50 that is welded transversely to the forward edge of the mounting arm 46. Through the agency of a pair of U-bolts 52 having nuts 54 thereon, it will be appreciated that each applicator 28 is secured to the frame 14, three of the applicators being fastened to the forward or front beam 16 and four to the rear beam 18.

At this time, attention is directed to a first saddle tank 56 of polyvinyl chloride and typically of 300 gallon capacity. This tank 56 is cradled between the auxiliary beams 24 and 26, appropriate straps or other fastening means being employed but not shown. It will be observed that the tank 56 has an outlet 56 that connects with a manifold 60 having the same number of flexible hoses 62 extending therefrom as there are applicators 28, more specifically, seven in the illustrative case. As will be perceived from FIG. 2, one of the hoses 62 connects with the upper ends of the tube 36. In actual practice, hose clamps are employed at both ends of the flexible hoses 62, but these have not been pictured.

Similarly, a second tank 64 corresponding to the tank 56 is cradled on the auxiliary beams 24 and 26. In this instance, the outlet from the tank 64 has been identified by the numeral 66 and connects with a manifold 68 having hoses 70 extending therefrom. As with one of the hoses 62, one of the hoses 70 is shown attached to the upper end of the tube 38.

In order to simplify the description as much as possible, the metering equipment associated with each of the manifolds 60 and 68 has not been depicted. However, it should be pointed out at this time that the tank 56 contains therein anhydrous ammonia and the tank 64 contains therein a phosphoric acid. The unpictured metering equipment would be adjusted so as to supply the proper amount of anhydrous ammonia in relation to the proper amount of liquid phosphoric acid.

Consequently, when the blade 30 of each applicator 28 advances through the soil, the cutting edge 32 forms a narrow furrow or slit. As the furrow is formed, nitrogen in the form of anhydrous ammonia is delivered downwardly through the forward tube 36, being discharged via the open end 36a at the proper soil depth which assures efficient nutrient utilization. It will be seen that the discharge end 36a resides in a horizontal plane and by reason of this the open end is not subjected to clogging from the soil that is pushed to one side by the blade 30.

The trailing tube 38 conducts the liquid in the form of phosphoric acid therethrough, discharging it via the open end 38a at a somewhat higher elevation than the elevation of the open end 36a. It is important to have the open end 38a rearwardly spaced from the open end 36a. This is so as to avoid an adverse reaction between the anhydrous ammonia and the phosphoric acid at the discharge ends of the tubes. More specifically, the rearward spacing of the discharge end 38a is at least 1.5 inches behind the discharge end 36a. Hence, a very efficient distribution of the two fertilizer components is achieved when practicing my invention.

I claim:

1. In combination, a first tank containing a supply of anhydrous ammonia, a second tank containing a supply of phosphoric acid, a single blade member having a narrow forward cutting edge and a wider rear edge, a first tube communicatively connected directly to only said first tank and mechanically secured to said blade adjacent said rear edge having a lower open end for discharging anhydrous ammonia from said first tank into the furrow formed by said blade member as said blade member advances through the soil to be fertilized, a second tube communicatively connected directly to only said second tank and mechanically secured to said first tube behind said first tube having a lower open end for discharging phosphoric acid from said second tank into the furrow rearwardly of said first tube, the lower end of said first tube being at an elevation slightly below the elevation of the lower end of said second tube, and a shoe member secured to the lower end of said blade member and extending rearwardly to a location beneath only the lower end of said first tube.

2. A fertilizer applicator in accordance with claim 1 in which said second discharge end is spaced rearwardly from said first discharge end by a distance of at least 1.5 inches.

3. A fertilizer applicator in accordance with claim 1 in which said tubes are generally parallel and in which the lower ends of said tubes reside in generally parallel planes.

* * * * *

UNITED STATES PATENT AND TRADEMARK OFFICE
CERTIFICATE OF CORRECTION

PATENT NO. : 4,424,757
DATED : January 10, 1984
INVENTOR(S) : James R. Gibbens

It is certified that error appears in the above—identified patent and that said Letters Patent are hereby corrected as shown below:

In column 2, line 1, "beome" should be -- become --;
In column 2, line 5, "clutivator" should be -- cultivator --;
In column 2, line 35, "illusrtate" should be -- illustrate --.

In column 3, line 29, "56" (second occurrence) should be -- 58 --.

Signed and Sealed this

Seventeenth Day of April 1984

[SEAL]

Attest:

Attesting Officer

GERALD J. MOSSINGHOFF

Commissioner of Patents and Trademarks